United States Patent [19]

Schaffner et al.

[11] 3,861,871

[45] Jan. 21, 1975

[54] PROCESS FOR THE DYEING OF NATURAL AND SYNTHETIC POLYAMIDE FIBRE MATERIAL

[75] Inventors: Karl Schaffner, Ramlinsburg; Gerald Siegrist; Hans Wegmuller, Riehen, all of Switzerland

[73] Assignee: Ciba-Geigy AG., Basle, Switzerland

[22] Filed: Mar. 15, 1972

[21] Appl. No.: 235,070

[30] Foreign Application Priority Data
Mar. 29, 1971  Switzerland.......................... 4568/71

[52] U.S. Cl. ..................... 8/169, 8/41 B, 8/1 XA, 8/39 R, 8/42 B
[51] Int. Cl. .............................................. D06p 1/86
[58] Field of Search ...................... 8/169, 172, 174

[56] References Cited
FOREIGN PATENTS OR APPLICATIONS
2,032,391  11/1970  France ................................... 8/174
2,019,321  7/1970  France ................................... 8/174
513,918  10/1939  Great Britain ........................... 8/84

*Primary Examiner*—Donald Levy
*Attorney, Agent, or Firm*—Joseph G. Kolodny; Edward McC. Roberts; Prabodh I. Almaula

[57] ABSTRACT

Process for the dyeing of natural and synthetic polyamide fibre material from organic solvents by the exhaustion process with difficultly water-soluble dye salts of anionic dyestuffs, the dye liquors applicable for this purpose, as well as the polyamide fibre material dyed, said process being characterised in that the fibre material is treated with the solution or suspension of at least one difficultly water-soluble dye salt consisting of the anionic radical of an anionic dyestuff and an organic cation in a liquid, non-water-miscible, organic solvent boiling above 50°C which contains, relative to the weight of the material being treated, an addition of 0.1 to 100% of water and, optionally, up to 5% of an acid.

12 Claims, No Drawings

PROCESS FOR THE DYEING OF NATURAL AND SYNTHETIC POLYAMIDE FIBRE MATERIAL

The present invention concerns a process for the dyeing of natural and synthetic polyamide fibre material from organic solvents by the exhaustion process with difficultly water-soluble dye salts of anionic dyestuffs, the dye liquors applicable for this purpose, as well as the polyamide fibre material dyed by the said process.

Various suggestions have been made for the dyeing of fibre material by the exhaustion process with solutions of dyestuffs in organic solvents or solvent mixtures. It has thus been recommended that fibre material be dyed with solutions of anionic dyestuffs in organic solvents not miscible with water, in which solvents the dyestuff is dispersed or solubilised by means of a tenside. These processes have the disadvantage that the anionic dyestuffs draw inadequately on to fibre materials, particularly on to natural polyamide; and that the dyeings obtained in this manner have unsatisfactory fastness properties, especially poor fastness to perspiration and to washing.

It has furthermore been suggested that natural and synthetic textile material be dyed with a water-in-oil emulsion consisting of a liquid organic solvent not miscible with water, an aqueous solution or dispersion of a water-soluble or water-dispersible dyestuff which is insoluble or, at most, difficultly soluble in the stated solvent, and a surface-active compound as emulsifier. In order to obtain dyeings which are free from spotiness by this process, however, it is always necessary to emulsify large amounts of surfactant, a factor which, however, renders extremely difficult the recovery of the organic solvents.

It has now been found, surprisingly, that natural and synthetic polyamide fibre material can be dyed level and fast and with good yield by the exhaustion process, without the employment of anionic and/or non-inorganic surfactants as emulsifiers, by treating the fibre materials with the solution or suspension of at least one difficultly water-soluble dye salt consisting of the anionic radical of an anionic dyestuff and an organic cation in a liquid, non-water-miscible organic solvent boiling above 50°C which contains, relative to the weight of the material, 0.1 to 100% of water. Advantageously, a further addition is made to the dye bath of up to 5%, relative to the weight of material, of an acid. The wet-fastness properties of the dyeings thus obtained correspond to those of dyeings obtained with corresponding dyestuff sodium salts from an aqueous bath.

Particularly suitable difficultly water-soluble dye salts usable according to the invention consist of the anionic radical of an anionic dyestuff, and the cationic radical of an alkyl-, cycloalkyl- or aralkyl-isothiourea derivative capable of salt formation.

Suitable isothiourea derivatives capable of salt formation are, in particular, derivatives of formula I:

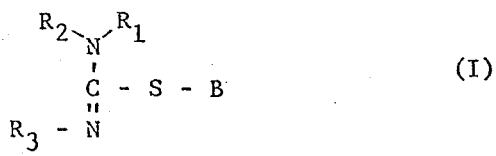

wherein $R_1$, $R_2$ and $R_3$ each independently represent hydrogen, an aliphatic, cycloaliphatic, araliphatic or aromatic hydrocarbon radical, $R_2$ and $R_3$ being also able to form, together with the group

the radical of a partially saturated ring, and represents an unsubstituted or substituted alkyl or alkenyl group having 1 to 22 carbon atoms which can be interrupted by hetero atoms, a cycloalkyl group, or an unsubstituted or substituted aralkyl group.

Isothiourea derivatives of formula I are known and can be produced by conventional methods.

If $R_1$, $R_2$ and/or $R_3$ in formula I represent an aliphatic hydrocarbon radical, this can be, in particular, an unsubstituted lower alkyl group having preferably 1 to 4 carbon atoms, such as the methyl, ethyl, isopropyl or tert-butyl group. Where $R_1$, $R_2$ and $R_3$ represent a cycloaliphatic hydrocarbon radical, this can be e.g. the cyclohexyl group. In the case where $R_1$, $R_2$ and $R_3$ represent an araliphatic hydrocarbon radical, this preferably contains 7 to 9 carbon atoms, such as the phenethyl group, and particularly the benzyl group. If $R_1$, $R_2$ and/or $R_3$ represent an aromatic hydrocarbon radical, it is, e.g., an unsubstituted or substituted phenyl radical, suitable substituents being in this case halogen, such as chlorine or bromine, lower alkyl or lower alkoxy groups having preferably 1 or 2 carbon atoms.

If $R_2$ and $R_3$ form, together with the group

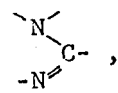

the radical of a partially saturated ring, such rings are, in particular, diazole or diazine rings. Examples of these are the $\Delta_2$-imidazolinyl or the $\Delta_2$-tetrahydropyrimidinyl group.

As an unsubstituted or substituted alkyl or alkenyl group having 1 to 22 carbon atoms, B represents a straight-chain or branched alkyl or alkenyl group which can contain as substituents, e.g., the hydroxyl group, a lower alkoxy group, such as the methoxy or ethoxy group, or a phenoxy group, such as the methyl, ethyl, isopropyl, amyl, hexyl, octyl, dodecyl, tetradecyl, hexadecyl, octadecyl, octadec-9-enyl, β-hydroxyethyl, β-methoxyethyl, β-ethoxyethyl, β-phenoxyethyl or 12-hydroxyoctadec-9-enyl group. If the alkyl or alkenyl group B is interrupted by hetero atoms, then particularly chains interrupted by oxygen atoms are to be considered. Examples of such groups are the β-dodecyloxyethyl and β-octadecenyloxyethyl group.

B represents as a cycloalkyl group, in particular, the cyclohexyl group. As examples of unsubstituted or substituted aralkyl groups represented by B, mention is made of the phenethyl group, especially, however, of the non-further-substituted benzyl group.

Particularly valuable difficultly water-soluble dye salts usable according to the invention consist of the anionic radical of an anionic dyestuff, and an isothiourea derivative of formula I wherein $R_1$, $R_2$ and $R_3$ each independently represent hydrogen, or an unsubstituted alkyl radical having 1 to 4 carbon atoms, and B represents an unsubstituted alkyl or alkenyl group having 8 to 18 carbon atoms, such as the octyl, decyl, dodecyl, octadecyl or octadec-9-enyl group, or the benzyl group.

A further group of valuable difficultly water-soluble dye salts usable according to the invention consist of the anionic radical of an anionic dyestuff and the cation of an organic nitrogen compound containing at least one nitrogen atom capable of salt formation.

The nitrogen atom capable of salt formation of the organic nitrogen compounds usable according to the invention can be present in the form of a primary, secondary, tertiary or quaternary amino group. Mentioned as especially suitable compounds are, for example:

1. Substituted or unsubstituted aliphatic amines such as butylamine, hexylamine, octylamine, decylamine, dodecylamine, tetradecylamine, octadecylamine, diethylamine, dibutylamine, dioctylamine, didodecylamine, N-methyl-N-dodecylamine, N-ethyl-N-octadecylamine, triethylamine, tributylamine, N,N-dimethyl-N-dodecylamine, N,N-dimethyl-N-octadecylamine, β-hydroxyethylamine, γ-hydroxypropylamine, N,β-hydroxyethyl-N-dodecylamine, γ-methoxypropylamine, N-γ-methoxypropyl-N-dodecylamine, N-β-hydroxyethyl-N-octadecylamine, N,N-dimethyl-N-benzyl-dodecylammonium hydroxide, N,N,N-trimethyloctadecylammonium hydroxide and trimethyldodecylammonium hydroxide.

2. Substituted and unsubstituted aliphatic di- and triamines, such as 1,2-ethylenediamine, 1,3-propylenediamine, diethylenetriamine, 1,1-bis-methylpropylenediamine, 1,1-bis-dodecylpropylenediamine, 1,1-bis-cyclohexylpropylenediamine, 1,1-bis-benzylpropylenediamine, N,N'-bisphenylethylenediamine, N,N,N',N'-tetrapropylpropylenediamine, N,N,N',N'-tetrabenzylpropylenediamine, N,N,N',N'-tetra-β-hydroxyethylpropylenediamine, 1-dodecylethylenediamine, 1-octadecylethylenediamine and 1-octadecyldiethylenetriamine.

3. Substituted and unsubstituted cycloalkylamines, such as cyclohexylamine, N-methylcyclohexylamine, N-octylcyclohexylamine, N-β-hydroxyethylcyclohexylamine, N-methyl-N-β-hydroxyethylcyclohexylamine, dicyclohexylamine, trimethylcyclohexylammonium hydroxide and dehydroabietylamine.

4. Substituted or unsubstituted aralkylamines, such as benzylamine, β-phenylethylamine, N-β-hydroxyethylbenzylamine, N-γ-methoxypropylbenzylamine, N-β-cyanoethylbenzylamine, N-methyl-N-γ-methoxypropylbenzylamine, N-octylbenzylamine, N-octadecylbenzylamine and dibenzylamine.

5. Substituted or unsubstituted aromatic amines, especially mononuclear aromatic amines, such as aniline, N-methylaniline, N,N-dimethylaniline, N,N-dibutylaniline, N-β-hydroxyethyl-N-methylaniline and toluidine.

6. Unsubstituted or substituted amidines, such as acetamidine, benzamidine, lauramidine, stearamidine, as well as N-methyl-lauramidine, N-butyl-lauramidine, N-phenyllauramidine, N-benzyl-lauramidine, N-methylstearamidine, N-benzyl-stearamidine or N-cyclohexyl-stearamidine.

7. Guanidines such as phenylguanidine, benzylguanidine, dodecylguanidine and octadecylguanidine.

8. Hydrazines such as phenylhydrazine or undecylhydrazine.

9. N-containing five- and six-membered heterocycles, which can be partially or fully saturated.

Suitable five-membered N-containing heterocycles are, e.g.: pyrroles such as methylpyrrole and benzylpyrrole; pyrrolines such as methylpyrroline or benzylpyrroline; also pyrrolidines such as methylpyrrolidine, butylpyrrolidine or dodecylpyrrolidine; pyrazoles; pyrazolines such as N-methylpyrazoline; pyrazolidines, particularly imidazolines such as 2-heptylimidazoline, 2-undecylimidazoline, 2-heptadecylimidazoline, 1-methyl-2-undecylimidazoline, 1-β-hydroxyethyl-2-undecylimidazoline, 1-β-hydroxyethyl-2-heptadecylimidazoline and 2-aminoethyl-1-heptadecylimidazoline.

Suitable six-membered, N-containing heterocycles are e.g.: piperidine and its derivatives, particularly N-alkyl- or N-aralkylpiperidines such as N-methylpiperidine, N-dodecylpiperidine and N-benzylpiperidine; piperazines such as N-octadecylpiperazine; morpholine, and especially its N-alkyl and N-aralkyl derivatives such as N-butylmorpholine, N-octadecylmorpholine or N-benzylmorpholine; quinuclidine, pyridine, N-methylpyridinium hydroxide and octadecyloxymethylenepyridinium hydroxide; pyrimidines such as dihydro- and, in particular, tetrahydropyrimidines, e.g. 2-heptyltetrahydropyrimidine, 2-undecyltetrahydropyrimidine, 2-heptadecyltetrahydropyrimidine, 1-methyl-2-undecyltetrahydropyrimidine or 1-β-hydroxyethyl-2-heptadecyltetrahydropyrimidine; 2-amino-1-octadecyltetrahydropyrimidine; 1,3,5-triazines, particularly derivatives of 2,4,6-triamino-1,3,5-triazines such as 2-dodecylamino-4,6-bis-amino-1,3,5-triazine or 2-octadecylamino-4,6-bis-amino-1,3,5-triazine, 2-heptadecyl-4,6-bis-amino-1,3,5-triazine or hexahydro-1,3,5-triazine derivatives.

10. Condensed N-containing heterocycles such as indolines and indoles.

Alkylamines are preferred having an alkyl radical preferably containing 12 to 18 carbon atoms, particularly dodecylamine and octadecylamine; alkylguanidines preferably having 12 to 18 carbon atoms in the alkyl radical, such as dodecylguanidine or octadecylguanidine; alkylamidines preferably having 12 to 18 carbon atoms in the alkyl radical, such as N-methyl-stearamidine or N-benzyl-lauramidine; alkylimidazolines and alkyltetrahydropyrimidines preferably having 11 to 18 carbon atoms in the alkyl radical, such as 2-undecylimidazoline, 2-heptadecylimidazoline, 2-undecyltetrahydropyrimidine as well as 2-heptadecyltetrahydropyrimidine and N-alkyl derivatives thereof.

Suitable liquid, non-water-miscible, organic solvents boiling above 50°C for the process according to the invention are, in particular, such solvents having boiling points between 50° and 180°C, advantageously between 100° and 150°C, e.g. aromatic hydrocarbons such as toluene, chlorobenzene or xylene, and especially halogenated aliphatic hydrocarbons, particularly chlorinated hydrocarbons such as chloroform, carbon tetrachloride, trifluorotrichloroethane, dichloroethane, trichloroethane, tetrachloroethane, dibromoethylene, dichloropropane, trichloropropane, pentachloropropane, chlorobutane, dichlorobutane or dichlorohexane, and, in particular, tri- or tetrachloroethylene ("perchloroethylene"). It is also possible to use mixtures of such solvents. It is, however, advantageous, with regard to the recovery of the solvent, to employ only one solvent.

In general, amounts of water in the dye baths of 0.1% to 100%, preferably of 20 to 50%, and especially of 20 to 30%, have proved advantageous in the case of the dyeing of synthetic polyamide, and amounts of water of 30 to 50% in the case of the dyeing of wool, the percentage amounts being relative to the material being dyed.

It proves useful in some cases to add to the dye baths up to 5 per cent by weight, relative to the weight of the material being dyed, of an acid, particularly of an organic lower aliphatic carboxylic acid, such as formic and acetic acid. In the dyeing of synthetic polyamide, an addition of 0.5 to 2% of acetic or formic acid, relative to the material being dyed, has, in general, proved to be advantageous for the attainment of even dyeings, and likewise in the dyeing of wool an addition of 0.5 to 3% of formic acid, relative to the material being dyed.

Suitable difficultly water-soluble dye salts of anionic dyestuffs to be used according to the invention, are, in particular, the acid wool-dyestuffs which can belong to the most diverse classes of dyestuffs, e.g., oxazine, triphenylmethane, xanthene, nitro, methine, quinophthalone, acridone or phthalocyanine dyestuffs, especially, however, metallised and metal-free monoazo, disazo or polyazo dyestuffs, anthraquinone dyestuffs or copper-phthalocyanine dyestuffs. Of the stated non-metallised azo and anthraquinone dyestuffs, those preferred are those containing one or two sulphonic acid groups. Suitable metal-complex azo dyestuffs are, e.g., such which contain two azo dyestuffs molecules to one metal atom. And suitable metal atoms are, in particular, chromium or cobalt. These 1:2-metal-complexes can moreover be free from acid, water-solubilising groups such as carboxylic acid groups, and especially sulphonic acid groups, and contain instead alkylsulphonyl or sulphamoyl groups. Surprisingly, also with the use of such 1:2-metal-complexes, particularly deeply coloured and fast dyeings are obtained by the process according to the invention. Mentioned also are the formazan dyestuffs containing as metal atom, in particular, copper, but also nickel.

The difficultly water-soluble dye salts usable according to the invention are known.

The preparation of these dye salts from the anionic dyestuff and the isothiourea derivative or the organic nitrogen compound having at least one nitrogen atom capable of salt formation, can be performed in situ, i.e., in the dye solution itself. Advantageously, however, the dye salts are prepared beforehand, in a known manner, and then added to the dye solution. In this case, the dye salts can be prepared, advantageously at raised temperature, by double reaction of the alkali metal or ammonium salt, particularly the sodium salt, of the anionic dyestuff, e.g., with the salt of an isothiourea derivative capable of salt formation, or with the salt of an organic nitrogen compound containing at least one nitrogen atom capable of salt formation, with a strong acid such as hydrochloric acid; or by direct neutralisation of the anionic dyestuffs in the form of their free sulphonic acids with the isothiourea derivatives, or with the aforesaid organic nitrogen compounds.

If the dye salts are prepared in situ, then the anionic dyestuffs are also preferably used in the form of their alkali metal or ammonium salts, particularly in the form of their sodium salts and the isothiourea derivative or the organic nitrogen compound is also advantageously used in the form of a salt with a strong acid, whereby the desired dye salt is obtained by the double salt formation. In this case, it is advantageous to remove insoluble constituents from the dye liquor, e.g., by filtration, before the introduction of the fibre material to be dyed.

If anionic dyestuffs are used which can form doubly or multiply negatively charged anions, then it is in many cases not necessary that these charges be completely compensated by the organic cation.

The anionic dyestuffs used as starting materials for the difficultly water-soluble dye salts usable according to the invention are known and can be produced by conventional methods. As typical examples of such dyestuffs there may be mentioned those of U.S. Pat. Nos. 2,760,967; 2,817,660; 2,826,572, and 3,136,752; and British Pat. No. 1,167,664.

U.S. Pat. No. 2,760,967 is directed to sulphonated anthraquinone-bis-phenylmercaptophenylamino)-compounds. Example 1, therein discloses the structure

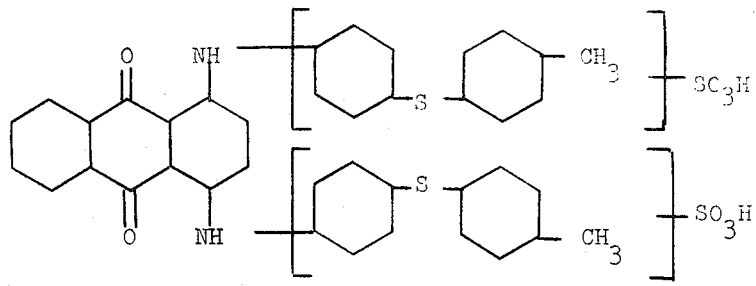

The β-positions of the anthraquinone nucleus may be halogen substituted, particularly with chlorine.

U.S. Pat. No. 2,817,660 is directed to diazo dyestuffs, suitable for dyeing polypeptide material. Example 1 is of the structure:

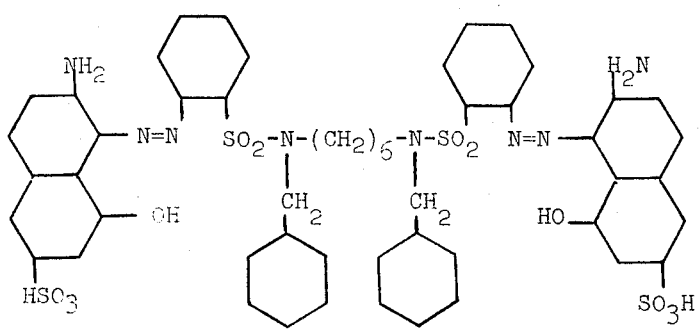

Preferably the tetrazo components are not sulphonated and the benzene rings of the acyl radicals thereof are not further substituted. The benzene rings may, however, advantageously contain non-ionogenic substituents, for example, halogen, alkyl, alkoxy, phenoxy, acylamino, or alkyl sulphonyl groups.

U.S. Pat. No. 2,826,572 is directed to o,o'-dihydroxyazo dyestuffs, containing chromium, of the type $(F_1-M_1-F_2)M_2$, wherein $F_1$ and $F_2$ represent the same or different o,o'-dihydroxyazo dyestuffs of the 5-pyrazolone series, $M_1$ represents a chromium atom and $M_2$ represents the equivalent of a cation, in particular a monovalent alkali cation. A monoazo dyestuff of the general Formula I and a monoazo dyestuff of the general Formula II

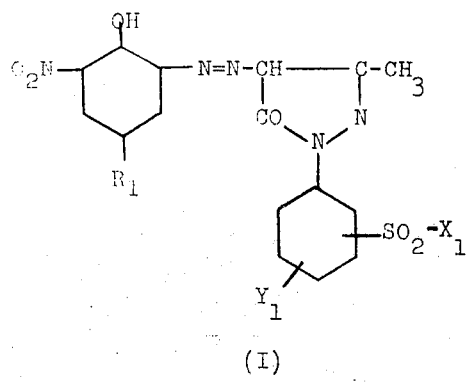

(I)

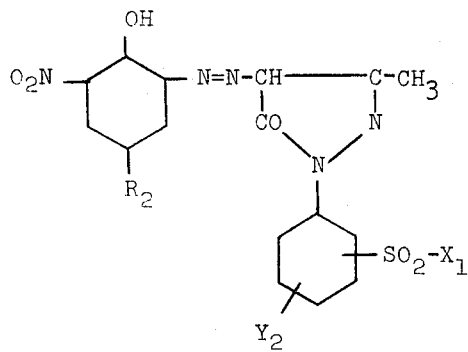

(II)

which contain no acid water solubilising groups such as, e.g., sulphonic acid or carboxyl groups, are reacted with agents giving off chromium in such amounts that there are two dyestuff molecules linked with one chromium atom.

In these formulae: $R_1$ represents an alkyl or cycloalkyl radical with 4–8 carbon atoms, $R_2$ represents an alkyl radical with 1–5 carbon atoms or chlorine, $X_1$ and $X_2$ represent the $-CH_3$, $-NH_2$, $-NHCH_3$ or $-NHC_2H_4OH$ group, and $Y_1$ and $Y_2$ represent H, $-CH_3$ or Cl.

Dyestuffs of the general Formula I usable according to the present invention are obtained, e.g. from the following diazo components: 4-n-butyl, 4-tert- butyl-, 4-n-amyl-, 4-tert- amyl-, 4-cyclohexyl- or 4-octyl-6-nitro-2-amino-1-hydroxybenzene.

As azo components such 1-phenyl-3-methyl-5-pyrazolones can be used with are substituted in the phenyl radical, preferably in the 3- or 4-position by, for example a sulphonic acid amide, methyl amide, ethanol amide group or by a methyl sulphonyl group and which may contain also methyl or chlorine substituents in the 4- or 6-position for example.

Suitable monoazo dyestuffs of the general Formula II which can be used according to the present invention are obtained from the following diazo components: 4-methyl, 4-isopropyl-, 4-n-butyl, 4-tert- butyl-, 4-n-amyl- or 4-tert-amyl-6-nitro-2-amino-hydroxybenzene. As coupling components the 3-methyl-5-pyrazolone compounds listed above as suitable for the production of the monoazo dyestuff I can be used.

U.S. Pat. No. 3,136,752 is directed to acid anthraquinone dyestuffs of the formula

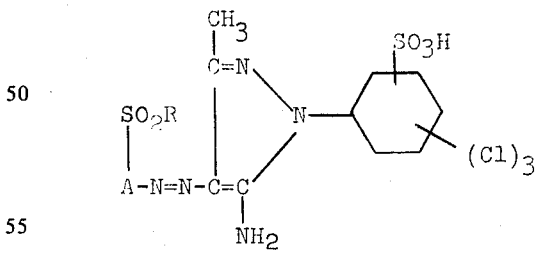

wherein R represents either lower alkyl or benzyl, mono or bicyclic aryl, mono- or bicyclic aryloxy,

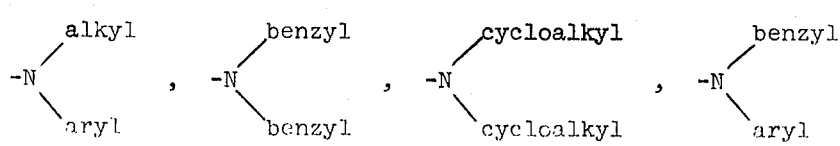

piperidino and morpholino, the —N-aryl substituted being mono- or bicyclic, and wherein A is a benzene ring a phenoxy group when the —SO₂R group is in 4-position to the azo bridge, or with a chloroacetylamino or a phenoxy group, when the —SO₂R group is in 2-position to the azo bridge, and n is one of the numerals 0 to 2 inclusive, are obtained, if the corresponding diazotised 2- or 4-amino-benzene-1-sulphonyl compound is coupled with a compound of formula

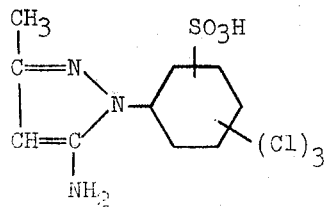

wherein n has the meaning given above.

The radical R can be, for example, a lower alkyl group, e.g., methyl, ethyl, propyl, a benzyl or an at most bicyclic carbocyclic aryl group. Substituents which can be used in the ring, when R represents an at most bicyclic carbocyclic aryl or aryloxy radical or when in the above mentioned amine radical one of the substituents is an aryl radical, are halogens such as fluorine, chlorine, bromine, aliphatic groups such as methyl, ethyl, tert- butyl, tert- amyl octyl, tetramethylene groups such as methoxy, ethoxy, butoxy, phenoxy or phenylthio groups; acylamino groups such as acetyl, choracetyl, β-bromopropionyl; dimethylacroyl, phenacetyl, phenoxyacetyl, carbomethoxy, carboethoxy, carbobutoxy, carbocyclohexyloxy, benzoyl, chlorobenzoylamino groups; triazinylamino groups, carboxyl groups, modified carboxyl groups such as carboxylic acid ester or carboxylic acid amide groups; sulphonic acid groups and modified sulphonic acid groups such as sulphonic acid aryl ester and sulphonic acid amide groups; acylated sulphonic acid amide groups having an acyl radical derived from aliphatic or aromatic carboxylic or sulphonic acids; alkyl and aryl sulphonyl groups.

British Pat. No. 1,167,664 is directed to acid anthraquinone dyestuffs of the formula

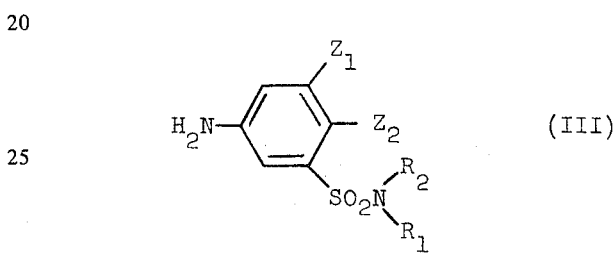

wherein

M⁺ represents a colourless cation,

X represents hydrogen or a monovalent substituent, $Z_1$ and $Z_2$ independently of each other represent identical or different lower alkyl groups, $R_1$ represents a lower, unsubstituted or substituted alkyl group, and $R_2$ represents hydrogen or a lower, unsubstituted or substituted alkyl group or $R_1$ and $R_2$ together with the nitrogen atom to which they are linked, represent the radical of a 5- or 6-membered heterocyclic, one ring member of which other than said nitrogen atom is a methylene group or an oxygen or a sulphur atom, all other ring members being methylene groups by reacting an anthraquinone compound of the general formula II

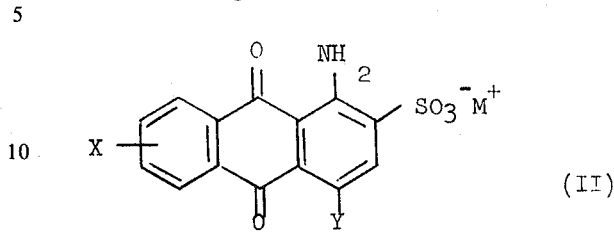

wherein

X and M⁺ have the meanings given in formula I and

Y represents a halogen atom, particularly bromine, with a novel amine of the general formula III

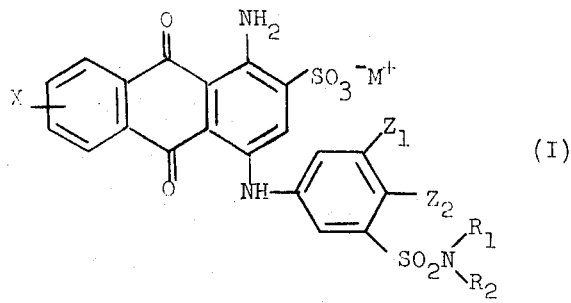

wherein $R_1$, $R_2$, $Z_1$, and $Z_2$ have the meanings given in formula I, the reaction performed at a temperature in the range of from 50° to 100°C in an aqueous medium having a pH of at least 5, preferably a pH of at least 7, and in the presence of an acidbinding agent and a copper catalyst, to form an anthraquinone dyestuff of the general formula I.

The term "lower" whenever used herein to describe alkyl and alkoxy groups signifies such groups having from 1 to 4 carbon atoms.

As monovalent substituent, X in the foregoing formulae represents, e.g., halogen such as chlorine or bromine, lower alkyl groups such as the methyl or ethyl groups, also the sulphonic acid group. Preferably, however, X represents hydrogen.

Lower alkyl groups in the position of $Z_1$ and $Z_2$ can be, e.g. the methyl, ethyl, n- or isopropyl group. Preferably each of $Z_1$ and $Z_2$ represents the methyl group.

As lower, unsubstituted alkyl groups, $R_1$ and $R_2$ represent e.g. the methyl, ethyl or isopropyl group; as lower substituted alkyl groups, advantageously they represent an alkyl group substituted by hydroxyl such as the β-hydroxyethyl or γ-hydroxypropyl group; however, they can also represent an alkyl group substituted by a lower alkoxy, hydroxy-lower alkoxy or lower alkoxy-lower alkoxy group, e.g., the methoxypropyl, β-hydroxy-ethoxy or β-methoxyethoxyethyl group. If $R_1$ and $R_2$ together with the nitrogen atom to which they are linked, form a 6-membered heterocyclic ring, optionally with the inclusion of another hetero atom in the latter, then this can be, e.g., the piperidide or morpholide group. Preferably, however, $R_1$ is a hydroxylalkyl group, particularly the β-hydroxyethyl group, and $R_2$ is hydrogen.

Chlorine and, particularly, bromine are suitable as halogen atoms in the position of Y.

The amounts in which the difficultly water-soluble dye salts are used in the dye baths can vary within wide limits depending on the desired depth of colour; in general, amounts of 0.01 to 20 per cent by weight, relative to the material being dyed, have proved to be advantageous.

Mentioned as polyamides which can be dyed by the process according to the invention are: natural polyamides such as wool; and synthetic polyamides such as polyhexamethylene adipic amide (polyamide 6.6, nylon), polycaprolactam (polyamide 6, "Perlon") and polyamidoundecanoic acid (polyamide 11, "Rilsan"), particularly in the form of filament; also textured synthetic polyamide fibres, such as "Banlon." The polyamides can also be in admixture with other natural or synthetic fibre materials, e.g., cotton, cellulose acetate, polyester or polyacrylonitrile.

The aforesaid fibre material made from natural and synthetic polyamide can be dyed according to the invention in the most diverse stages of processing; for example, the said material may be in the form of flock, slubbing, yarn, textured threads, fabrics or knitwear.

The process according to the invention, which is preferably carried out in closed pressure-tight apparatus, e.g., circulation-apparatus, winch-dyeing apparatus, drum-dyeing machines, vats, paddles, cheese-dyeing apparatus, can be performed, for example, as follows: The dyestuff is mixed to a paste with a little organic, non-water-miscible solvent in the cold state; water is added and, optionally, an amount of acid; and the mixture is subsequently diluted with the organic, non-water-miscible, optionally heated solvent to obtain the desired dyestuff concentration; and the material to be dyed is then introduced into the thus obtained dye liquor at ca. 50°C, the ratio of goods to liquor being 1:3 to 1:100, preferably 1:8 to 1:20. It has proved advantageous in some cases to use a dye liquor which has been very thoroughly mixed by means of a high-speed stirrer for 2 to 5 minutes. The dye bath is then heated within 10 to 20 minutes to temperatures of between 80° and 120°C, preferably 100°C, and maintained at this temperature for about 5 to 60 minutes, preferably 20 minutes. The material being dyed is afterwards removed from the bath and then, if necessary after a brief rinsing with fresh organic solvent, in certain cases with the addition of 1 to 2 per cent by volume of water, for 5 minutes at 50° to 60°C, subjected to a centrifuging or suction treatment, and finally air-dryed at 20° to 120°C.

It is remarkable that it is now possible, with the aid of the process according to the invention to dye, in a gentle manner, natural and synthetic polyamides in deep shades. Even, deeply coloured and fast dyeings, e.g., dyeings which are fast to dry-cleaning, washing, perspiration and rubbing are obtained on the aforementioned fibre material. By virtue of the high level of bath exhaustion, a subsequent cleansing of the dyed material is not necessary is most cases. Furthermore, a compensation of differences of affinity due to the material is renderend possible, i.e., an appreciable levelling of streakiness on smooth and textured polyamide filament materials, or an extensive levelling of skittery dyeing on wool.

If, instead of the defined dye salts being used in the process according to the invention, the corresponding watersoluble dyestuff sodium salts are used in the said process, then unusable, uneven, spotty dyeings are obtained.

The temperatures are expressed in degrees Centigrade in the following examples.

EXAMPLE 1

A polyamide-6.6 tricot is placed at ca. 50° into a closed pressure-tight dyeing apparatus (Callebaut De Blicquy Dyeing Apparatus, an autoclave in which there are dye bombs with supports for fabrics or yarns sealed in the bomb with the dye liquor) (ratio of goods to liquor 1 : 20) containing a dye liquor prepared as follows:

An amount of 0.05 g of the dyestuff of the formula:

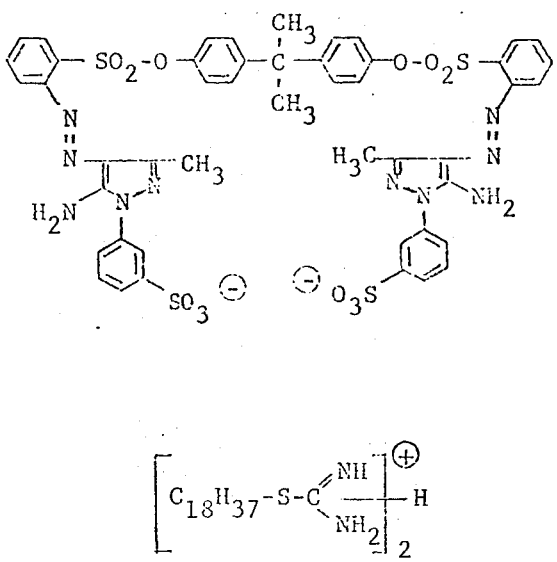

is stirred to a paste at room temperature with 10 g of tetrachloroethylene; an addition is then made of 1.5 ml of water and 0.1 ml of glacial acetic acid; the mixture is diluted with 150 g of tetrachloroethylene; and the liquor obtained is subsequently thoroughly mixed for 3 minutes with a turbo-mixer. The dye bath is thereupon heated, with continual movement of the material being dyed, for 15 minutes to 100°, and held for 20 minutes at this temperature. After cooling, the dyed material is removed and dried. The dye bath is substantially exhausted.

In this way a deeply coloured, non-streaky and well developed yellow polyamide dyeing having good fastness to rubbing, to water, and to dry cleaning is obtained.

If, in the above example, the dye bath is heated within 10 minutes to 80°, and maintained for 30 minutes at this temperature, then a yellow dyeing is obtained possessing similar properties.

If, instead of the dye salt described, an equivalent amount of the corresponding sodium salt of the dyestuff is used, with the procedure otherwise as described in the example, then an uneven, spotty, unusable dyeing is obtained.

EXAMPLE 2 a. A polyamide-6.6 tricot is dyed with application of the procedure described in Example 1, but with the use in this case of a dye liquor consisting of 0.05 g of the dye salt of the formula:

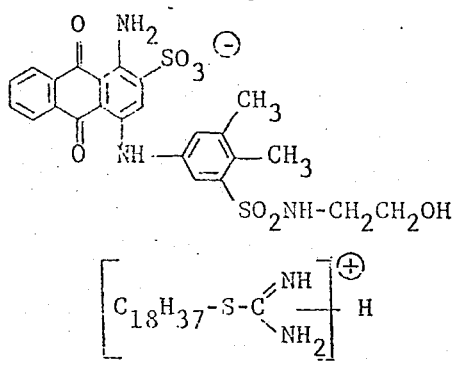

in 160 g of tetrachloroethylene and 1.5 ml of water.

After cooling, the dyed material is removed; it is then rinsed with 160 g of tetrachloroethylene and 1.5 ml of water at 50° for 5 minutes, centrifuged, and finally dried in an air stream at 50°.

A deeply coloured, level and well developed blue dyeing is obtained having good fastness to rubbing and to dry cleaning.

If, in the above example, the dye bath is heated for 10 minutes to 80° and maintained for 20 minutes at this temperature, then an equally good, level, non-streaky, deeply coloured blue dyeing is obtained.

If no water is used in the above example, the procedure being otherwise as described in the example, then an appreciably less deeply coloured dyeing is obtained.

b. If, instead of the dye salt given in Example 2(a), equal amounts of the dye salt of the formula

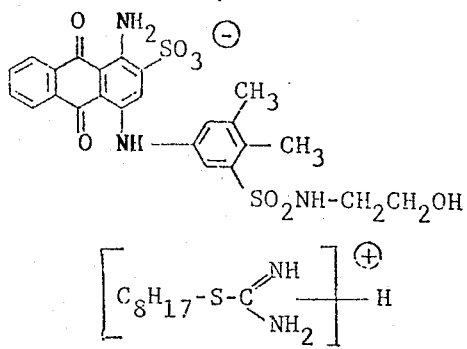

are employed, the procedure being otherwise as described in the example, then a blue dyeing is obtained possessing similar properties.

EXAMPLE 3 a. A dye liquor is prepared as follows: 0.05 g of the dye salt of the formula given in Example 2(a) or 2(b) is added at room temperature, with stirring, to 140 g of trichloroethylene; additions are then made of 1 ml of water and 0.1 ml of glacial acetic acid, and the liquor is subsequently stirred for 3 minutes with a turbo-stirrer. 5 g of polyamide-6.6 tricot are dyed in this liquor, the procedure being as described in Example 1, but with employment of the following temperatures: heating for 15 minutes to 85° with maintenance of this temperature for 25 minutes.

After cooling, the dyed material is removed; it is then rinsed with 140 g of trichloroethylene and 1.5 ml of water at 30° for 5 minutes, well centrifuged, and finally dried in an air stream at 50°.

A deeply coloured, non-streaky, even and well developed blue dyeing is obtained having good fastness to wet-processing.

Instead of using trichloroethylene, it is possible to use as solvent, with equal success, the same amount of 1,1,1-trichloroethane, trifluorotrichloroethane or tetrachloroethylene.

b. If, instead of the dye liquor described in the example, a correspondingly prepared liquor is employed consisting of 0.05 g of the dye salt of the formula given in Example 2(a) or 2(b), 160 g of tetrachloroethylene, 2 ml of water and 0.1 ml of 85% formic acid, and instead of 5 g of polyamide-6.6 tricot, 5 g of wool flannel, with the procedure otherwise as described in the example, then a non-skittery, blue wool dyeing is obtained possessing similarly good properties.

EXAMPLE 4 a. 5 g of wool flannel are dyed as described in Example 1 with application in this case of a dye liquor consisting of 0.05 g of the dye salt of the formula

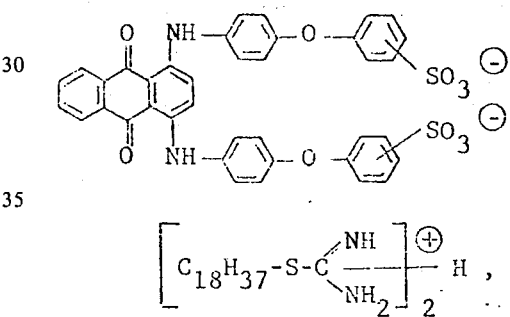

160 g of tetrachloroethylene, 2 ml of water and 0.1 ml of 85% formic acid.

A deeply coloured, even and well developed, non-streaky green wool dyeing is obtained possessing good fastness properties.

b. If, in the above example, there is used, instead of the described dye salt, an equivalent amount of the corresponding dyestuff sodium salt, the procedure being otherwise as described in the example, then an uneven, spotty and unusable dyeing is obtained.

EXAMPLE 5

An amount of 5 g of polyamide-6.6 tricot and an amount of 5 g of wool flannel are dyed as described in Example 1 and Example 4, respectively, but with the use of a dye liquor consisting of: 0.05 g of the dye salt of the formula:

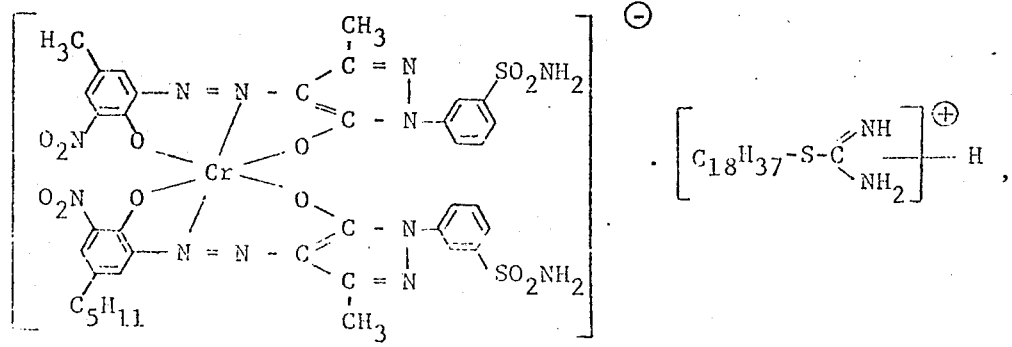

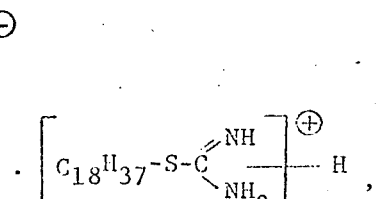

160 g of tetrachloroethylene, with 1.5 ml of water and 0.1 ml of glacial acetic acid for the dyeing of polyamide-6.6, or with 2 ml of water and 0.1 ml of formic acid (85%) for the dyeing of wool flannel.

Deeply coloured, even and well developed red polyamide and wool dyeings are obtained having good fastness properties.

EXAMPLE 6

5 g of polyamide-6.6 tricot and 5 g of wool flannel are dyed as described in Example 1 and Example 4, respectively, but with the use in this case of a dye liquor consisting of: 0.04 g of the dye salt of the formula:

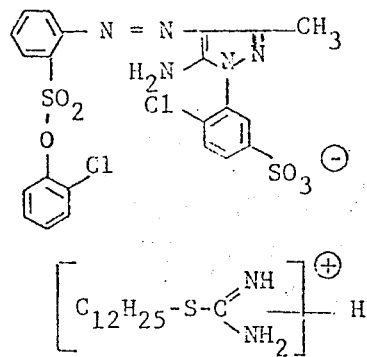

and 0.04 g of the dye salt of the formula given in Example 2(a) or 2(b), 160 g of tetrachloroethylene, with 1.5 ml of water and 0.5 ml of glacial acetic acid for the dyeing of polyamide-6.6, or with 2 ml of water and 0.1 ml of 85% formic acid for the dyeing of wool flannel.

After cooling, the dyed material is removed; it is then rinsed with 160 g of tetrachloroethylene and 1.5 ml of water of 50° for 5 minutes, centrifuged, and finally dried in an air stream at 50°.

A deeply coloured, even, non-streaky and well developed green polyamide dyeing is obtained having good fastness to rubbing, to water and to dry cleaning; and a deeply coloured, non-skittery green dyeing on wool flannel.

If, instead of a fabric made from polyamide-6.6, a fabric or knitted material made from polyamide-6 is used, the procedure being otherwise as described in the example, then likewise a deeply coloured and well-developed green dyeing having good fastness properties is obtained.

If instead of the dye salt mixture described in the above example, 0.05 g of one of the dye salts listed in the following Table I, Column 2, is used, with the procedure otherwise as given in the example, then likewise deeply coloured dyeings are obtained on polyamide-6.6 and on wool flannel in the shades shown in the last column of the table.

Table I

| Example No. | Dye salt | Shade on polyamide |
|---|---|---|
| 7 |  | blue |
| 8 |  | yellow |
| 9 | do | yellow |

Table I—Continued

| Example No. | Dye salt | | Shade on polyamide |
|---|---|---|---|
| 10 | (structure) | (structure) | do |
| 11 | do | (structure) | do |
| 12 | do | (structure) | do |
| 13 | (structure) | (structure) | yellow |
| 14 | do | (structure) | do |
| 15 | (structure) | (structure) | blue |
| 16 | do | (structure) | do |
| 17 | do | (structure) | do |
| 18 | do | (structure) | do |

Table I—Continued

| Example No. | Dye salt | | Shade on polyamide |
|---|---|---|---|
| 19 | do | · [C₆H₅-OCH₂CH₂-S-C(=NH)(NH₂)]⁺ · H⁻ | do |
| 20 | 1-amino-2-sulfo-4-(2,4,6-trimethyl-3-chloroacetylamino-anilino)anthraquinone | · [C₆H₅-CH₂-S-C(=NH)(NH₂)]⁺ · H⁻ | blue |
| 21 | 2-(2-chlorophenylsulfonyloxy)phenylazo-1-(2-chloro-5-sulfophenyl)-3-methyl-5-aminopyrazole | · [C₁₈H₃₇-S-C(=NH)(NH₂)]⁺ · H⁻ | yellow |
| 22 | do | · [C₆H₁₁-S-C(=NH)(NH-C₂H₅)]⁺ · H⁻ | do |
| 23 | Cr complex of 2-nitro-6-aminophenol → 1-phenyl-3-methyl-5-pyrazolone (azo) | · [C₁₈H₃₇-S-C(=NH)(NH₂)]⁺ · H⁻ | red |
| 24 | Cr complex of 1-hydroxy-2-(2-methoxyphenylazo)-3-(N,N-dimethylsulfamoyl)naphthalene | · [C₁₂H₂₅-S-C(=NH)(NH₂)]⁺ · H⁻ | blue |
| 25 | do | · [C₆H₅-CH₂-S-C(=NH)(NH₂)]⁻ · H | do |

EXAMPLE 26

An amount of 5 g of polyamide-6.6 tricot is dyed as described in Example 1, but using in this case a dye liquor consisting of 0.05 g of the dye salt of the formula:

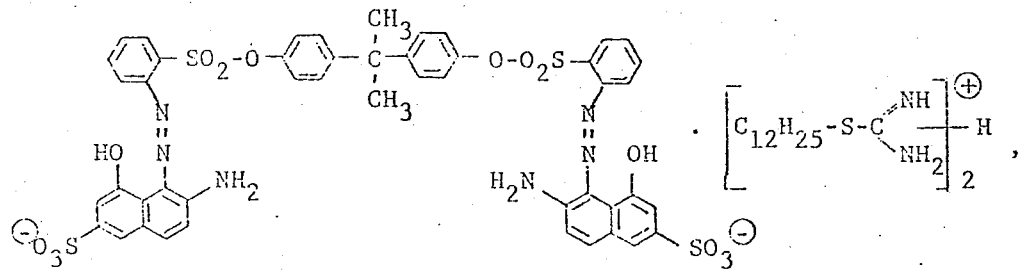

160 g of tetrachloroethylene, 1.4 ml of water, and 0.1 ml. of glacial acetic acid.

After cooling, the dyed material is removed; it is then rinsed with 160 g of tetrachloroethylene and 1.5 ml of water at 50° for 5 minutes, centrifuged, and dried in an air stream at 50°.

A deeply coloured, even, non-streaky and well developed red dyeing is obtained having good fastness properties.

The dye salt used in the above example is obtained, for example, as follows: An amount of 10.8 g of the dyestuff of the formula:

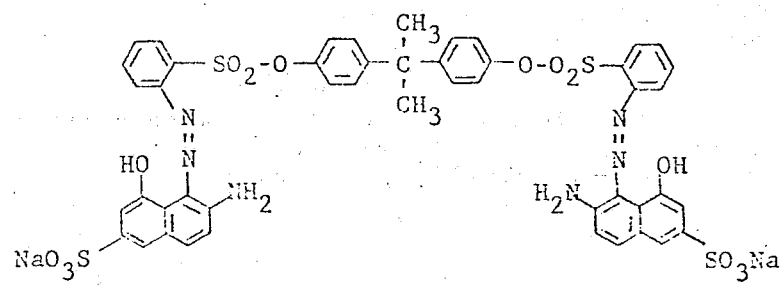

is dissolved in 1,000 ml of water at 50°. In a separate operation, 5.6 g of S-dodecylisothiourea hydrochloride are dissolved in 1,000 ml of water at 50°. The two solutions are then poured together, whereupon a finely dispersed red precipitate immediately forms. Whilst the dispersion is still warm, an addition is made to it, with stirring, of 40 g of sodium chloride; the reaction mixture is then allowed to stand one to two days at room temperature. After this period of time, the dye salt has almost completely settled out. The colourless solution on top is decanted off, the sediment is filtered under suction, and dried in vacuo at 50° to 60°. In this manner 12.2 g of the dye salt of the formula given in the first paragraph of this example are obtained, the dye salt being in the form of a solid brittle mass.

EXAMPLE 27

A dye liquor is prepared by suspending, with stirring, 0.01 g of the dye salt of the formula given in Example 1, 0.01 g of the dye salt of the formula given in Example 5, and 0.04 g of the dye salt of the formula given in Example 2 in 10 g of tetrachloroethylene at room temperature; an addition is then made of 1.25 ml of water and 0.1 ml of glacial acetic acid, the mixture is diluted with 150 g of tetrachloroethylene, and the liquor subsequently intensively mixed for 3 minutes with a turbostirrer. The dark green dye liquor thus obtained is used to dye 5 g of polyamide-6.6 tricot, the procedure being as described in Example 1.

A deeply coloured, even, non-streaky and well developed grey polyamide dyeing having very good fastness properties is obtained.

If, instead of 1.25 ml of water and 0.1 ml of glacial acetic acid, 0.75 ml of water and 0.05 ml of 85% formic acid are used, and instead of polyamide-6.6 tricot, 5 g of wool slubbing are dyed, the procedure being otherwise as described in Example 1, then a deeply coloured, well developed, non-skittery, grey wool dyeing having very good fastness to wet processing is obtained.

EXAMPLEE 28

An amount of 5 g of polyamide-6.6 tricot is dyed, under the conditions described in Example 1, with a dye liquor consisting of 0.05 g of the dye salt of the formula:

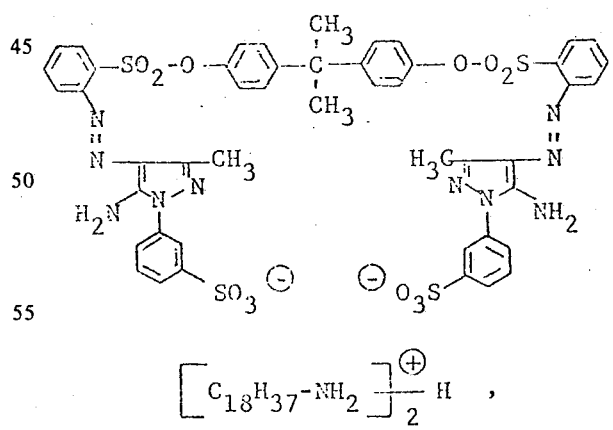

160 g of tetrachloroethylene, 1.5 ml of water and 0.1 ml of glacial acetic acid.

After cooling, the dyed material is taken out of the bath, rinsed with 160 g of tetrachloroethylene and 1.5 ml of water at 50° for 5 minutes, then centrifuged, and finally dried in an air stream at 50°.

A deeply coloured, even and well developed yellow dyeing having good fastness properties is obtained.

If the above example is repeated but without the addition of water, then an appreciably less deeply coloured dyeing is produced.

If, instead of the dye salt given in the example, 0.05 g of the dye salt of the following formula is used:

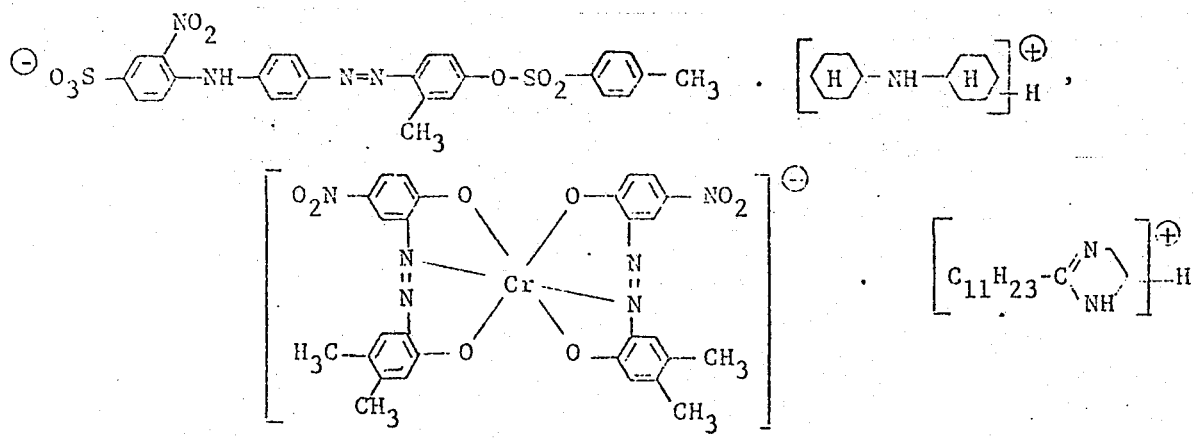

or 0.04 g of the dye salt of the formula:

do with otherwise the same procedure as described in the example, then a deeply coloured, even and well developed yellow polyamide dyeing having good fastness properties is obtained.

EXAMPLE 29

An amount of 5 g of wool flannel is dyed as described in Example 4; in this case, however, a dye liquor is used consisting of: 0.02 g of the dye salt of the formula:

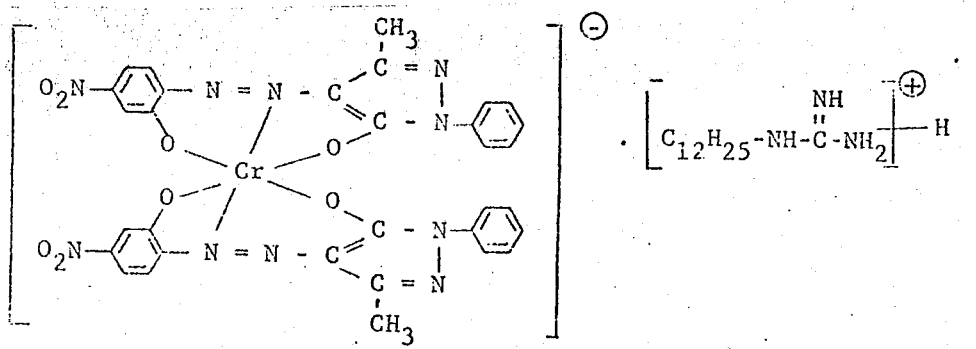

or 0.02 g of the dye salt of the formula:

do consisting of: 0.02 g of the dye salt of the formula:

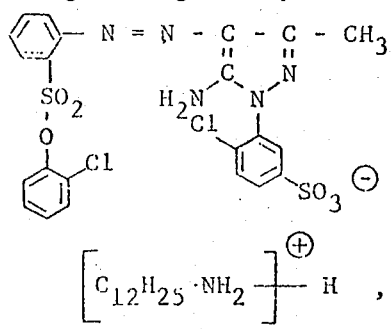

160 g of tetrachloroethylene, 2 ml of water and 0.1 ml of formic acid (85%)

A deeply coloured, even and well developed yellow dyeing having good fastness to wet processing is obtained.

If, instead of the dye salt described in the example, 0.04 g of the dye salt of the formula:

is used, the procedure being otherwise as described in the example, then dark brown wool dyeings equal in quality are obtained.

EXAMPLE 30

Polyamide-6.6 tricot is dyed as described in Example 1; in this case, however, a dye liquor is used consisting of: 0.02 g of the dye salt of the formula:

160 g of tetrachloroethylene, 1.5 ml of water and 0.1 ml of glacial acetic acid.

After cooling, the dyed material is removed; it is rinsed with 160 g of tetrachloroethylene and 1.5 ml of water at 50° for 5 minutes, then centrifuged, and afterwards dried in an air stream at 50°.

Deeply coloured, even, non-streaky and well developed red dyeings having good fastness properties are obtained.

If, instead of the dye salt given in the example, 0.05 g of the dye salt of the following formula is used:

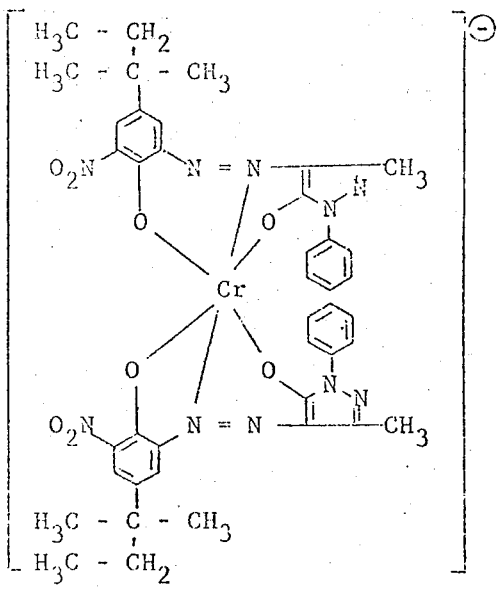

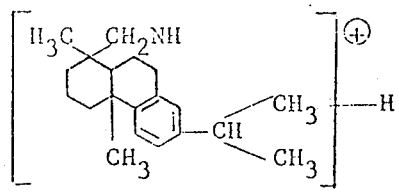

the procedure being otherwise as described in the example, then a deeply coloured, even and well developed red dyeing is obtained having good fastness to rubbing, to water and to dry cleaning.

EXAMPLE 31

100 g of Nylon 6.6 Helanca material are introduced at room temperature into a dyebath consisting of: 1.5 g of the dyestuff of the formula

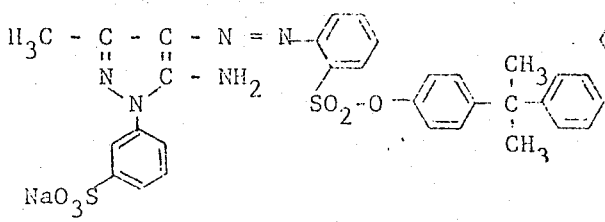

0.5 g of the isothiouronium hydrochloride of the formula

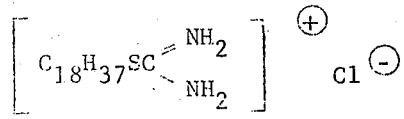

30 ml of water, 0.6 ml of 85% formic acid, and 970 ml of tetrachloroethylene. The temperature is slowly raised to 100° and dyeing is performed in a closed system for 60 minutes at this temperature.

A level yellow dyeing is obtained.

EXAMPLE 32

The procedure of Example 31 is followed, but using the following as dyestuff:

1.4 g of the sodium salt of the 2:1 chromium complex of the dyestuff mixture (in a ratio of 1:1) of the formulas

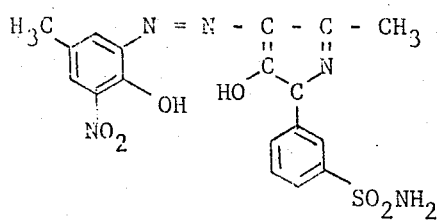

and

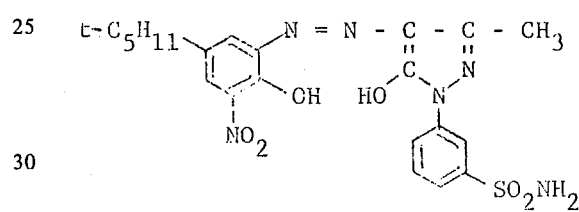

and 0.6 g of the isothiouronium hydrochloride given in Example 31.

A level red dyeing is obtained.

EXAMPLE 33

The procedure of Example 31 is followed, but using the following as dyestuff:

1.2 g of the dyestuff of the formula

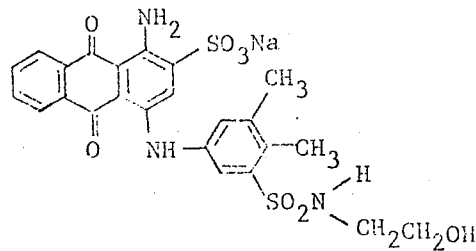

and 0.8 g of the isothiouronium hydrochloride given in Example 31.

A level blue dyeing is obtained

We claim:

1. A process for the dyeing of polyamide fibre material by the exhaustion process, wherein the fibre material is treated with a solution or suspension of at least one difficultly water-soluble dye salt of an anionic dye and an isothiourea in a liquid halo-lower-alkane solvent, boiling above 50°C, which contains, relative to the weight of the material being treated, an addition of 0.1 to 100% of water and up to 5% of an acid, said isothiourea is a compound of the formula

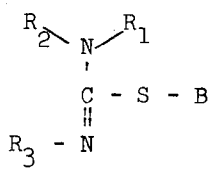

wherein
- $R_1$, $R_2$ and $R_3$ each is hydrogen, lower alkyl, cyclohexyl, benzyl, phenethyl or phenyl, and $R_2$ and $R_3$ taken together may be a $C_2$- or $C_3$-alkylene bridge; and
- B is alkyl or alkenyl of 1 to 22 carbon atoms, $C_1$- to $C_{20}$-alkoxy- or alkenoxy-ethyl, cyclohexyl, phenethyl, benzyl, or phenoxyalkyl 2. The process of claim 1, wherein $R_1$, $R_2$ and $R_3$ each is hydrogen or an unsubstituted alkyl radical having 1 to 4 carbon atoms, and B is an unsubstituted alkyl or alkenyl group having 8 to 18 carbon atoms, or the benzyl group.

3. The process of claim 1, wherein the halo-lower-alkane solvent is trichloroethylene or tetrachloroethylene.

4. The process of claim 1, wherein the amount of water used is 20 to 50% of the weight of material being treated.

5. The process of claim 1 wherein the acid is an organic acid.

6. The process of claim 5 wherein the organic acid and amount used is 0.5 to 3% of acetic or formic acid.

7. The process of claim 1, wherein the fibre material is wool.

8. A dye liquor consisting of a solution or suspension of at least one difficultly water-soluble dye salt consisting of an anionic radical of an anionic dyestuff and a cationic radical of an isothiourea derivative capable of salt formation, in a liquid halo-lower-alkane solvent, boiling above 50°C, which contains, relative to the weight of fibre material being dyed, an addition of 0.1 to 100% of water and up to 5% of an acid, wherein the isothiourea derivative is a compound of the formula

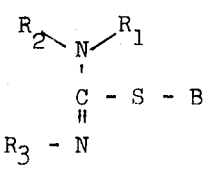

wherein
- $R_1$, $R_2$ and $R_3$ each is hydrogen, lower alkyl, cyclohexyl, benzyl, phenethyl or phenyl, and $R_2$ and $R_3$ taken together may be a $C_2$- or $C_3$-alkylene bridge; and
- B is alkyl or alkenyl of 1 to 22 carbon atoms, $C_1$ to $C_{20}$-alkoxy- or alkenoxy-ethyl, cyclohexyl, phenethyl, benzyl, or phenoxyalkyl.

9. The process of claim 1, wherein $R_1$, $R_2$ and $R_3$ are hydrogen.

10. The process of claim 9, wherein B is $C_8$-alkyl.

11. The process of claim 9, wherein B is $C_8$-alkyl.

12. The process of claim 9, wherein B is $C_{12}$-alkyl.

* * * * *

UNITED STATES PATENT OFFICE
CERTIFICATE OF CORRECTION

Patent No. 3,861,871　　　　　　　　　Dated January 21, 1975

Inventor(s) Schaffner et al.

It is certified that error appears in the above-identified patent and that said Letters Patent are hereby corrected as shown below:

Claim 10, Column 28, delete "$C_8$" - should read -- $C_{18}$ --.

Signed and sealed this 15th day of April 1975.

Attest:

RUTH C. MASON
Attesting Officer

C. MARSHALL DANN
Commissioner of Patents
and Trademarks